United States Patent [19]

Gille et al.

[11] Patent Number: 4,992,076
[45] Date of Patent: Feb. 12, 1991

[54] YOKE FOR HOOKES UNIVERSAL JOINT WHEREIN THE YOKE IS DIVIDED IN THE REGION OF THE BEARING BORE

[75] Inventors: Wilfried Gille, Dorsten; Dieter Heier, Gelsenkirchen; Gerd Sehlbach, Essen, all of Fed. Rep. of Germany

[73] Assignee: Gelenkwellenbau GmbH, Essen, Fed. Rep. of Germany

[21] Appl. No.: 315,942

[22] Filed: Feb. 24, 1989

[30] Foreign Application Priority Data

Feb. 27, 1988 [DE] Fed. Rep. of Germany ....... 3806259

[51] Int. Cl.$^5$ ............................................... F16D 3/41
[52] U.S. Cl. .................................. 464/130; 403/381; 464/135
[58] Field of Search ............... 403/331, 381; 464/128, 464/130, 134, 135, 136

[56] References Cited

U.S. PATENT DOCUMENTS

| | | | |
|---|---|---|---|
| 491,727 | 2/1893 | Maloney | 403/331 |
| 1,253,919 | 1/1918 | Williams | 464/136 X |
| 1,573,587 | 2/1926 | Tarbox et al. | 464/136 X |
| 2,141,264 | 12/1938 | Cutting | 464/130 |
| 2,300,658 | 11/1942 | Dunn | 464/130 X |
| 2,353,299 | 7/1944 | Dunn | 464/130 X |
| 3,421,342 | 1/1969 | Rossiter | 464/130 |
| 3,958,431 | 5/1976 | Moring | 464/130 |
| 4,077,235 | 3/1978 | Kleinschmidt et al. | 464/128 X |
| 4,090,796 | 5/1978 | Okuda et al. | 403/381 X |

FOREIGN PATENT DOCUMENTS

3209658 3/1982 Fed. Rep. of Germany .
593753 2/1925 France .

Primary Examiner—Daniel P. Stodola
Attorney, Agent, or Firm—Toren, McGeady & Associates

[57] ABSTRACT

A Hookes universal joint has each limb (5, 6) of its yokes provided at its free end with a removable portion (15, 115) which, when it is removed, leaves an opening to facilitate fitting of the respective journal (11, 111) of the joint cross member into the bore (9, 109) in the yoke arm. The removable portion and main part of the yoke arm have inter-engaging dovetail formations either of frusto-conical form (18, 19) or straight configuration (118, 119). When a bearing bush (13, 113) is fitted in the bore, the removable portion of the yoke arm is held in a position or orientation such that its dovetail formations cannot become disengaged. The necessity of providing the yoke arm with bores for fixing bolts, which would weaken it, is thus avoided.

11 Claims, 9 Drawing Sheets

YOKE FOR HOOKES UNIVERSAL JOINT WHEREIN THE YOKE IS DIVIDED IN THE REGION OF THE BEARING BORE

BACKGROUND TO THE INVENTION

1. Field of the Invention

This invention relates to Hookes universal joints, of the type which comprises two joint yokes rotatable about respective axes of rotation and connected together by a cross-member, each yoke comprising two spaced arms extending generally parallel to the rotational axis of the yoke, the arms being connected together at their one ends and provided adjacent their other, free, ends with bores having axes aligned with one another and extending perpendicular to the rotational axis of the yoke for receiving bearing bushes supporting an opposed pair of journals of the cross-member, each yoke arm comprising a main part and a removable portion connected to the main part of the arm in the region of the bore but offset from the bore axis towards the free end of the arm. Such a joint will hereafter be referred to as a Hookes universal joint of the kind specified.

In a Hookes universal joint of the kind specified, part of the circumferential surface of the bore in each yoke arm is provided on the removable portion of the arm. Removal of the portion leaves an opening into the bore, enabling the cross-member of the joint more easily to be positioned relative to the yoke such that its opposed journals lie within the bores in the yoke arms. The removed portions of the yoke arms can then be refitted thereto, and the bearing bushes fitted in the bores in the usual way, i.e. by inserting them radially inwardly towards the rotational axis of the yoke, along the axes of the bores in which they are received. This method of assembly is necessary in case the dimensions of the yoke arms and the cross-member are such that the cross member could not be maneuvered to fit its journals in the bores in the yoke arms if the yoke arms did not have their removable end portions.

2. Description of Prior Art

It has been proposed in German Patent Specification No. 3209658 to provide the removable portion of each yoke arm with projections which engage into corresponding recesses in the main part of the arm. The recesses have slightly conical faces, disposed about production axes offset from but parallel to the bore axis, and the removable portion is fitted by movement in the direction parallel to the bore axis. The removable portion is held to the main part of the yoke arm by bolts. However, the form fitting connection between the projections and recesses extends over only part of the thickness of the yoke arm, and the region in which the removable portion is connected to the main part of the arm is weakened by the necessity of providing holes for the securing bolts.

In addition to the disadvantage of the weakening effect of the holes for the securing bolts, there is a risk of the yoke arms undergoing uneven deformation under high torques, and the bearing bushes are not being adequately supported by the yoke arms.

SUMMARY OF THE INVENTION

It is the object of the present invention to provide a Hookes universal joint of the kind specified in which the above described disadvantages of a known joint are overcome. Thus, the connection of the removable portion of each arm should not unduly weaken the arm or prejudice the ability of the arm effectively to support the bearing bush.

According to one aspect of the present invention, we provide a Hookes universal joint of the kind specified wherein the main part and the removable portion of each yoke arm have inter-engaging dovetail formations, and the bearing bush holds the removable portion relative to the arm such that said formations cannot disengage.

In one embodiment of the invention described hereafter the dovetail formations extend parallel to the axis of the bore so that the removable portion is fitted to the main part of the arm by moving it parallel to the bore axis. In this case the bearing bush is provided with a screw-threaded external surface portion engaging correspondingly screw-threaded portions of the surface of the bore in both the main part and removable portion of the arm. Such screw-threaded engagement with the bearing bush once the bearing bush has been fitted prevents the removable portion of the arm from being removed.

In a further embodiment of joint according to the invention described hereafter the interengaging dovetail formations comprise faces of part frusto-conical configuration, disposed about a cone axis parallel to and spaced from the rotational axis of the yoke and intersecting the bore axis. Such faces preferably have maximum and minimum diameters greater than the thickness of the yoke arm and smaller than the width thereof in respective planes perpendicular to the cone arms and containing said diameters.

In this embodiment of the invention, the removable portion of the yoke arm is fitted by presenting it to the main part of the yoke arm in a direction parallel to the rotational axis of the yoke, but angularly displaced about the cone axis of the frusto-conical dovetail faces. Movement about the cone axis engages the dovetail faces. When the bearing bush is fitted, the removable portion cannot be moved angularly to disengage the dovetail formations.

In both embodiments of the invention, the objects of the invention are achieved in that the yoke arms do not have to be weakened by the provision of bolt holes, and the interengaging dovetail formations provide strength and rigidity in the construction.

Preferably, apart from the interengaging dovetail formations, a gap is defined between facing surfaces of the main part and removable portion or the yoke arm. This makes it easier to fit the removable portion and to remove it when required, in case the cross-member assembly has to be removed from the joint for servicing services.

Assembly of a joint according to the invention is particularly easy if the joint between the removable portion and main part of the yoke arm intersects the bore in the arm at a position to give, when the removable portion is removed, an opening into the bore of a width greater than the diameter of the journal of the cross member. If, however, the dimensions of the various parts and considerations of strength do not permit this, it is possible even if a narrower opening to the bore is provided to use this to facilitate the manoeuvering of the cross-member to introduce its journal into the bore.

To facilitate fitting of the bearing bush into the yoke arm bore, the invention provides that the removable portion of the yoke arm may be subjected to a bending force such as to cause an increase in a diametrical dimension of the bore. After the bearing bush is fitted, withdrawal of the bending force from the removable portion of the yoke arms returns the bore to its normal dimensions to hold the bush tightly therein.

To facilitate carrying out such a fitting process, the invention further provides a device comprising a bracket with portions arranged to rest on end parts of the removable portion of the yoke arm and provided with a central bore to receive a bolt which, by engaging with a screw-threaded bore in the removable portion, exerts the bending force on the removable portion when it is tightened.

BRIEF DESCRIPTION OF THE DRAWINGS

The invention will now be described by way of example with reference to the accompanying drawings, wherein.

DESCRIPTION OF PREFERRED EMBODIMENTS

Figure 1:
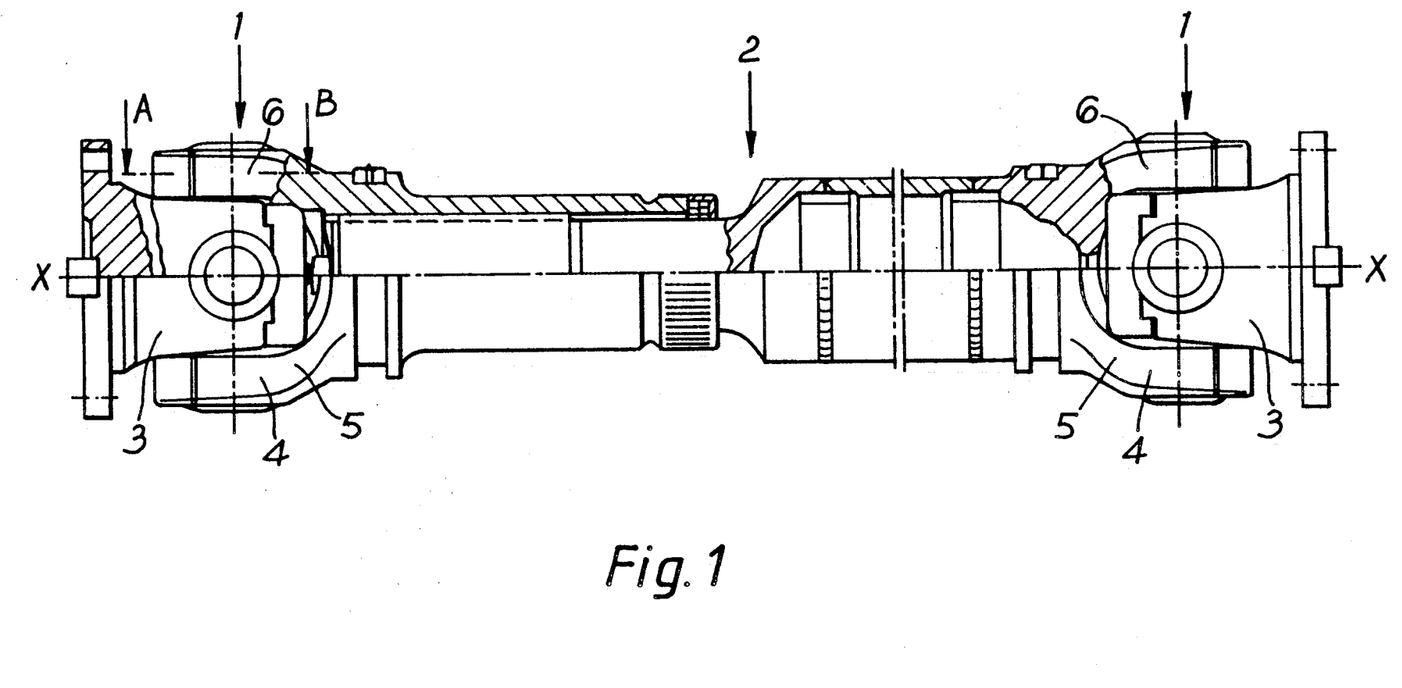
FIG. 1 shows, partly in section, a drive shaft having Hookes universal joints according to the present invention.

Referring firstly to FIG. 1 of the drawings, there is illustrated a drive shaft assembly which comprises two Hookes universal joints, each indicated generally at 1, connected by an intermediate shaft indicated generally at 2. The intermediate shaft 2 comprises two portions connected to one another by a sliding splined connection, to accommodate in known manner changes in the overall length of the drive shaft assembly. Each of the Hookes universal joints comprises two joint yokes 3, 4, connected to one another by a cross member. Each yoke comprises spaced arms 5, 6 which extend generally parallel to the rotational axis of the yoke in use, the arms being connected together at their one ends and adjacent their other, free, ends provided with bores whose axes are aligned with one another and extend perpendicular to the axis of rotation of the yoke. The bores in the limbs of one yoke receive a diametrically opposed pair of journals of the joint cross member, with the intermediary of bearing cups as will be described hereafter, and the bores in the arms of the other yoke receive the other pair of diametrically opposed journals of the joint cross member, disposed at right angles to the first such pair of journals. As will be seen from FIG. 1, for each of the universal joints one of the yokes is connected to an appropriate part of the intermediate shaft 2 while the other yoke of each joint has its arms connected together at a flange for bolted driving connection to another torque transmitting component.

In FIG. 1 all the universal joints are shown in the aligned condition, wherein they have a common rotational axis X—X.

Figure 2:
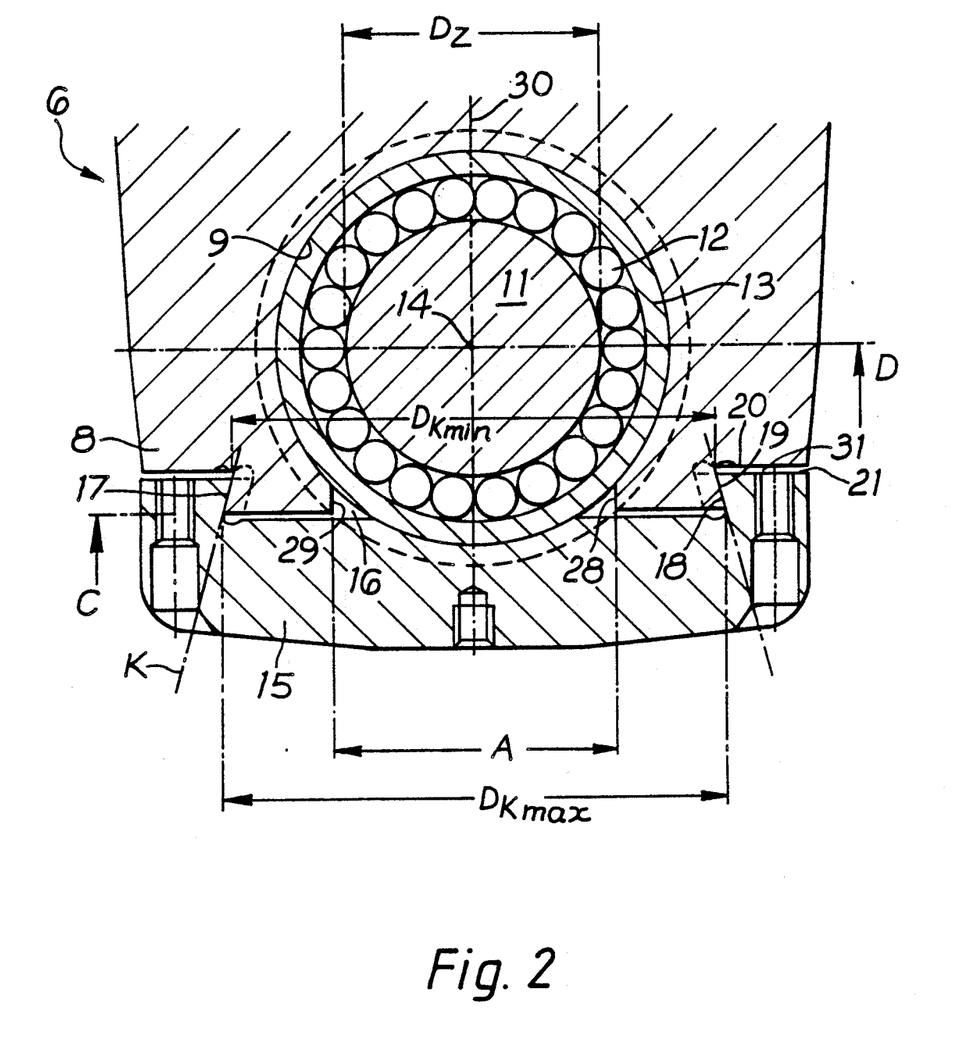
FIG. 2 is a section through part of one of the joints of the drive shaft, on the line A—B of FIG. 1.
Figure 3:
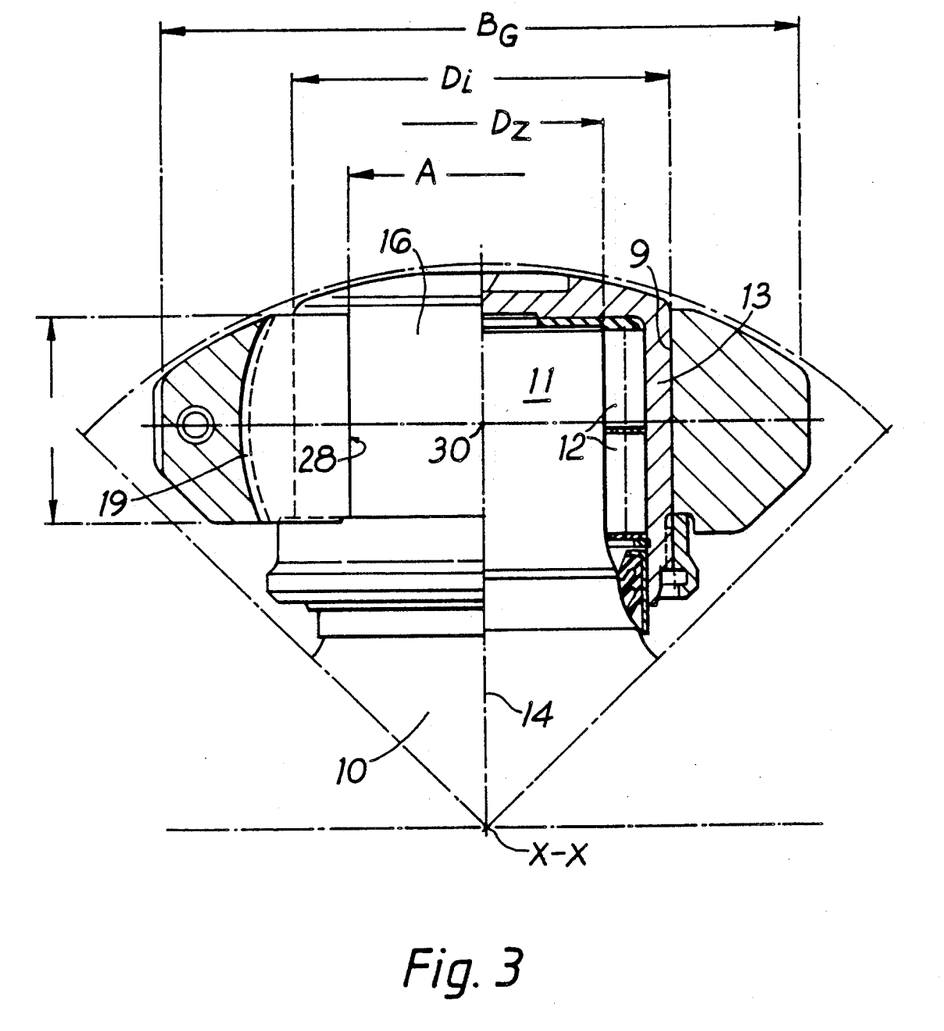
FIG. 3 is a section on the line C—D of FIG. 2.
Figure 4:
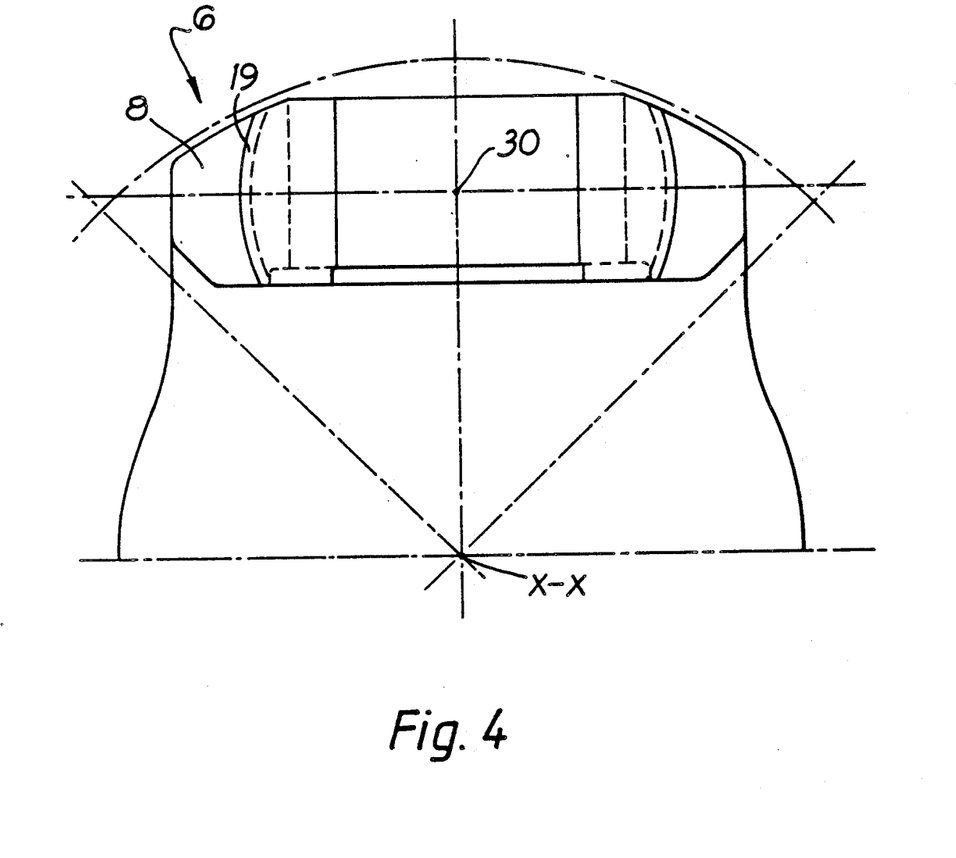
FIG. 4 is a view of the joint yoke arm shown in FIGS. 2 and 3, in a direction parallel to the axis of rotation thereof.

Referring now more particularly to FIGS. 2 and 3 of the drawings, these show in greater detail one of the arms 6 of a joint yoke 4. Adjacent the free end of the arm 6, there is seen the bore 9 whose axis 14 extends perpendicular to the axis of rotation X—X of the yoke as a whole, a cup-shaped bearing bush 13 being received in the bore 9. The bearing bush 13 supports, with the intermediary of roller elements 12, one of the journals 11 of the joint cross member 10. The arm comprises a main part 8, and, at its free end, a removable portion 15. The joint face between the main part 8 and removable portion 15 intersects the bore 9 chordally, at a position offset from the axis 14 of the bore towards the free end of the yoke arm. Part 9b of the circumferential surface of the bore 9 is provided on the removable portion 15. Thus when the portion 15 is not present, the bore 9 is open at the free end of the main part of the yoke arm, the opening 16 having a width A defined between limiting faces 28, 29. The width A is preferably, and in the illustrated embodiment is, greater than the diameter $D_Z$ of the cross member journal 11, so that the journal can be entered into the bore 9 in the direction parallel to the rotational axis X—X of the joint yoke.

The removable portion 15 has dovetail engagement with the main part of the yoke arm 6. This dovetail engagement is at a joint face 17 which is part frusto conical, forming part of an imaginary cone K whose central axis, 30, extends parallel to the rotational axis X—X of the joint yoke and intersects the bore axis 14. The joint face 17 occurs between cooperating faces 18, 19 on the removable portion 15 and main part 8 of the yoke arm, respectively, which faces may be produced by machining using a tool rotating about the cone axis 30 relative to the part in question. The engaging frusto-conical faces 18, 19 have a minimum diametrical dimension $D_{Kmin}$ and a maximum diametrical dimension $D_{Kmax}$, both of which dimensions are greater than the thickness $D_G$ of the yoke arm (measured parallel to the bore axis 14) and less than the overall width $B_G$ of the yoke arm (measured perpendicular to the bore axis 14) in respective planes perpendicular to the cone axis 30 and containing the diameters.

Figure 5:
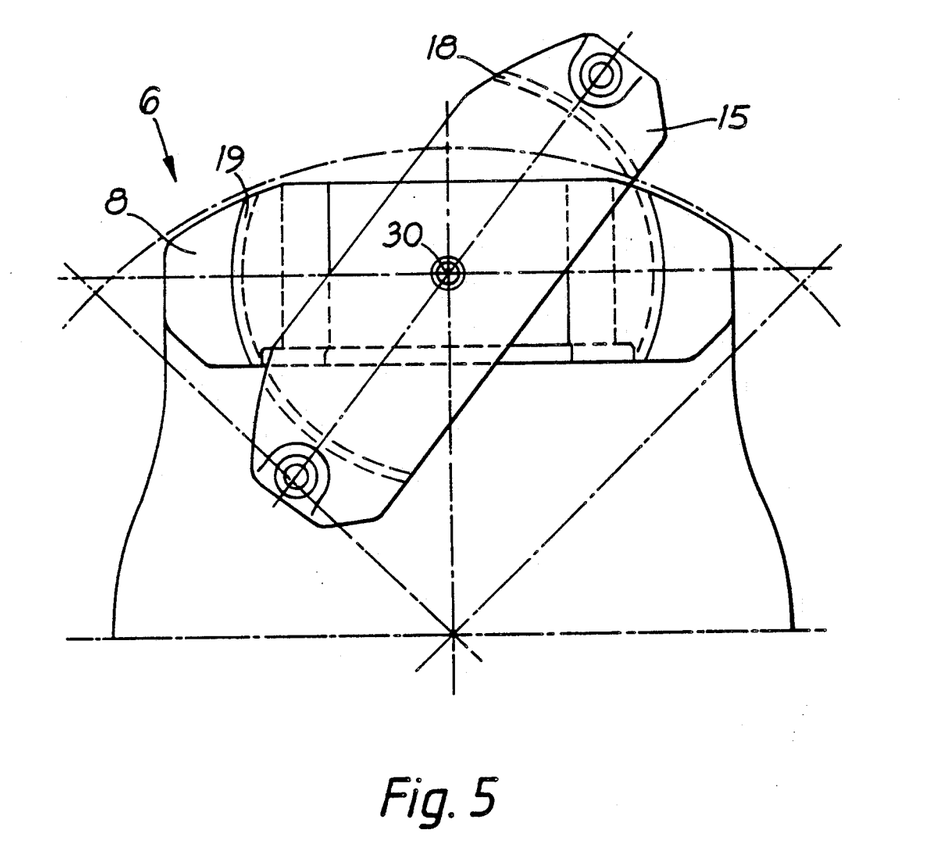
FIG. 5 is a view as FIG. 4 illustrating the relationship between the removable portion of the yoke arm and the main part thereof.

Apart from the inter-engaging dovetail faces 18, 19, a gap is defined between the facing surfaces 20, 21 of the main part 8 and removable portion 15 of the yoke arm. This gap, indicated at 31 in FIG. 2, enables the removable portion 15 to be moved towards the main part of the yoke arm, thereby disengaging the faces 18, 19 and permitting the removable portion to be swivelled about the cone axis 30. Then, when the removable portion 15 has reached the position shown in FIG. 5, it can be completely removed from the yoke arm. Such swivelling of the removable portion 15 can, of course, only take place when the bearing bush 13 is not present: when the bush is fitted in the bore 9 it engages the part of the bore surface provided in the portion 15 to hold the removable portion 15 in a position and orientation such that the faces 18, 19 are closely engaged.

From the above description of how the removable portion 15 can be removed from the yoke arm 6, it will be apparent how assembly of the joint is carried out. With the portion 15 removed, the journal 11 can enter the bore 9 in the main part of the yoke arm through the gap between the limiting faces 28, 29, in the direction of the conical axis 30. The removable portion 15 can then be presented to the yoke arm in the relative attitude shown in FIG. 5, and swivelled about the cone axis 30 until it is in the correct orientation for the faces 18, 19 to engage. The bearing bush 13 can then be fitted into the bore 9 in the direction along the bore axis 14, and when thus fitted the portion 15 is held in engagement. The external circumferential surface of the bearing bush engages the part of the circumferential surface of the bore provided in the portion 15, to hold the faces 18, 19 in close engagement.

Figure 6:
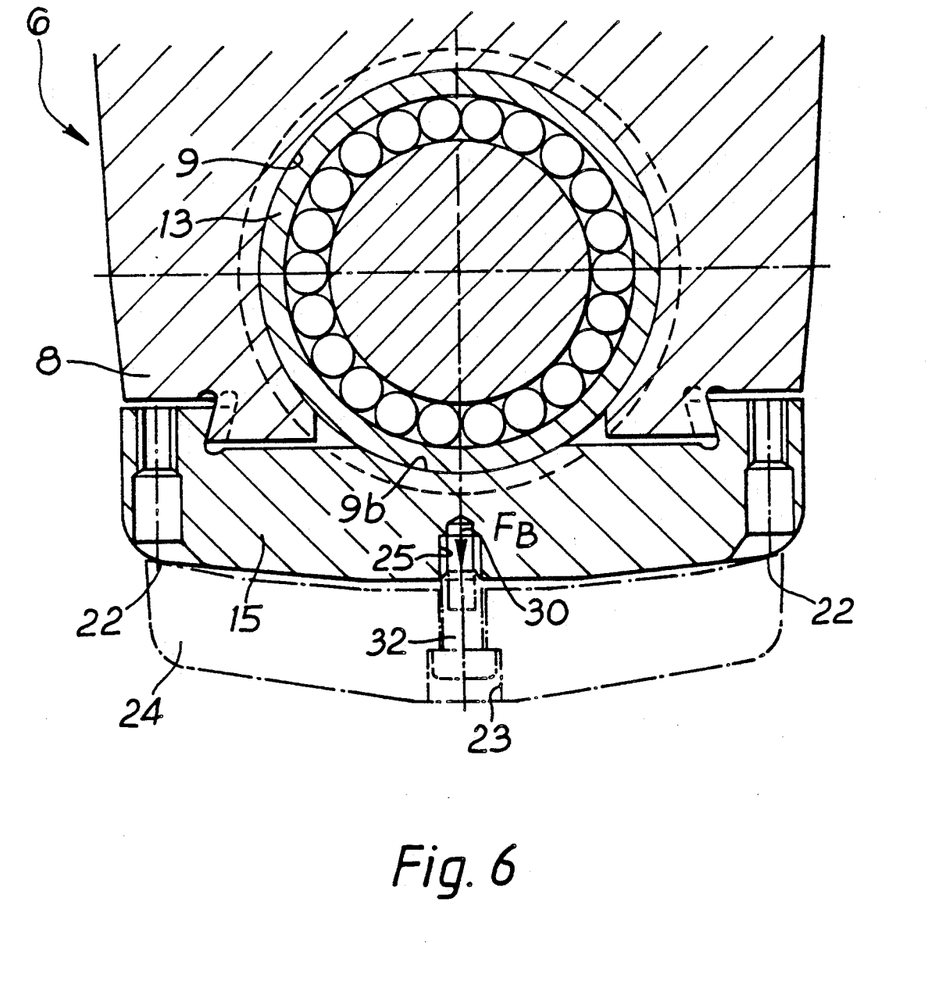
FIG. 6 is a view similar to that of FIG. 2, but showing a device for facilitating fitting of the bearing bush of the joint.

FIG. 6 shows how the operation of fitting the bearing bush may be facilitated. The principle is that the removable portion 15 is deformed slightly so as to provide some additional clearance for the fitting of the bearing bush. This is done by use of a curved bracket or bridging piece 24 so shaped that while its ends engage the portion 15 at 22 there is a slight clearance between the centre of the device 24 and the portion 15. At its centre, the device 24 has a counter-bored aperture 23 to receive a bolt 32, with the head of the bolt abutting the step formed in the aperture by the counter bore. The threaded shank of the bolt 32 is engaged with a screw-threaded blind bore 25 provided in the removable portion 15 of the yoke arm. It will be appreciated that when the bolt 32 is tightened, the effect is to apply a bending force to the portion 15 and deform it so that the diametrical dimension of the bore 9 in the direction of the axis 30 is slightly increased. The part, indicated at 9b, of the bore surface provided in the portion 15 is slightly deformed by the application of the bending force (indicated at $F_B$). The slight additional clearance provided in the region of the bore surface 9b in the portion 15 renders fitting the bearing bush easier.

After the bearing bush has been fitted, the bolt 32 is unfastened and the device 24 removed. Good support for the bearing bush in the region of the removable portion 15 is thus achieved.

Figure 7A:
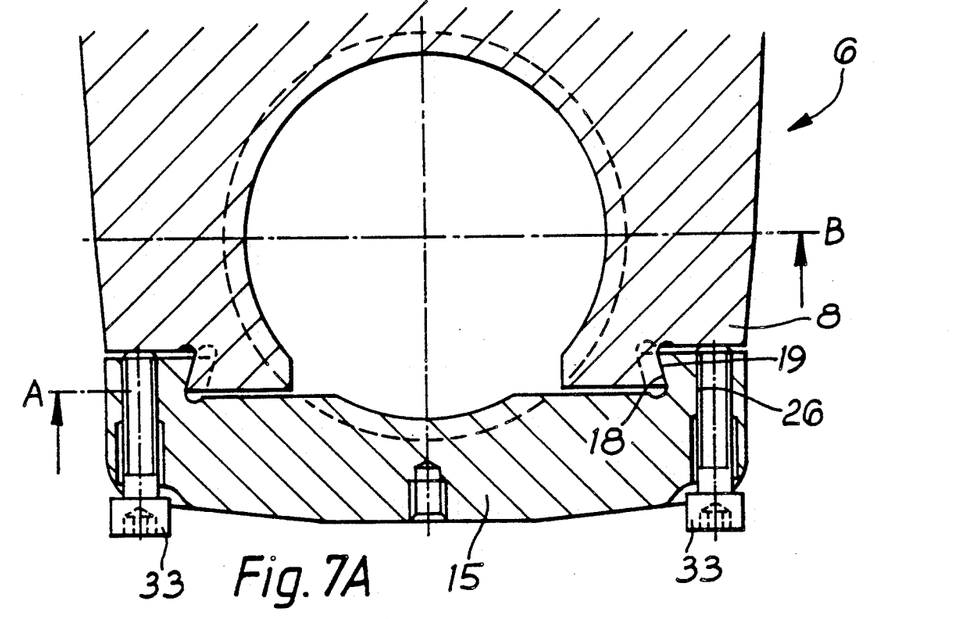
FIG. 7A is a view similar to that of FIG. 2 but showing how machining during manufacture of the joint is carried out.
Figure 7B:
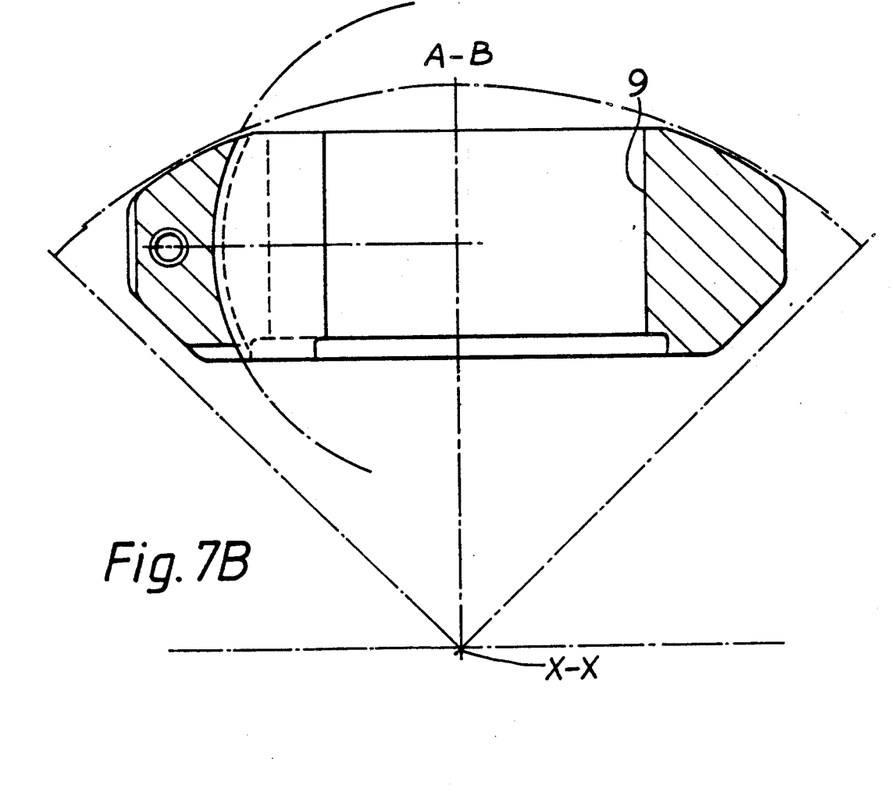
FIG. 7B is a section on the line A—B of FIG. 7A.

FIG. 7B shows how the removable portion 15 may be held to the main part of the yoke arm for the purpose of machining the bore 9 therein. The portion 15 has screw-threaded apertures 26 for receiving bolts 33, which bolts 33 when tightened engage the part 8 of the yoke arm 6 across the gap 31, so as to urge the frusto conical faces 18, 19 into engagement. The bore 9 may then be machined with the final assembly condition of the yoke arm simulated, so that a good fit of the bearing bush 13 in the bore is achieved.

Figure 8:
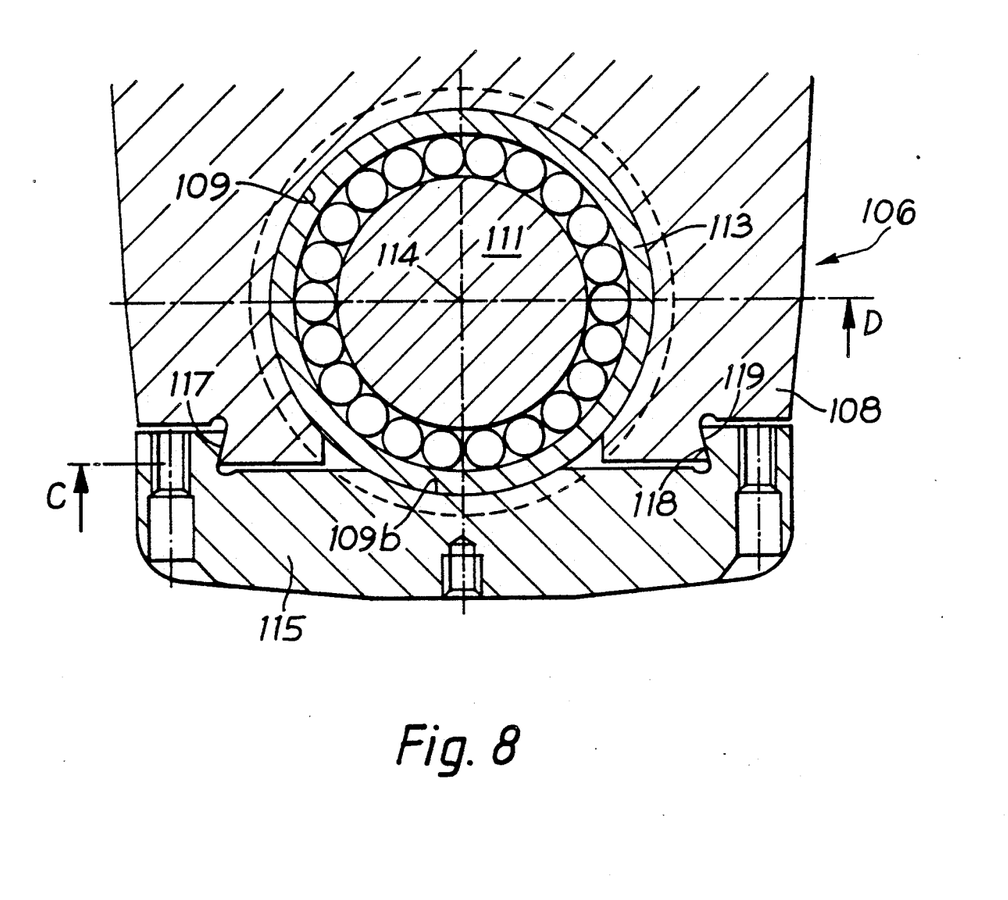
FIG. 8 is a section as that shown in FIG. 2, showing a further embodiment of the invention.
Figure 9:
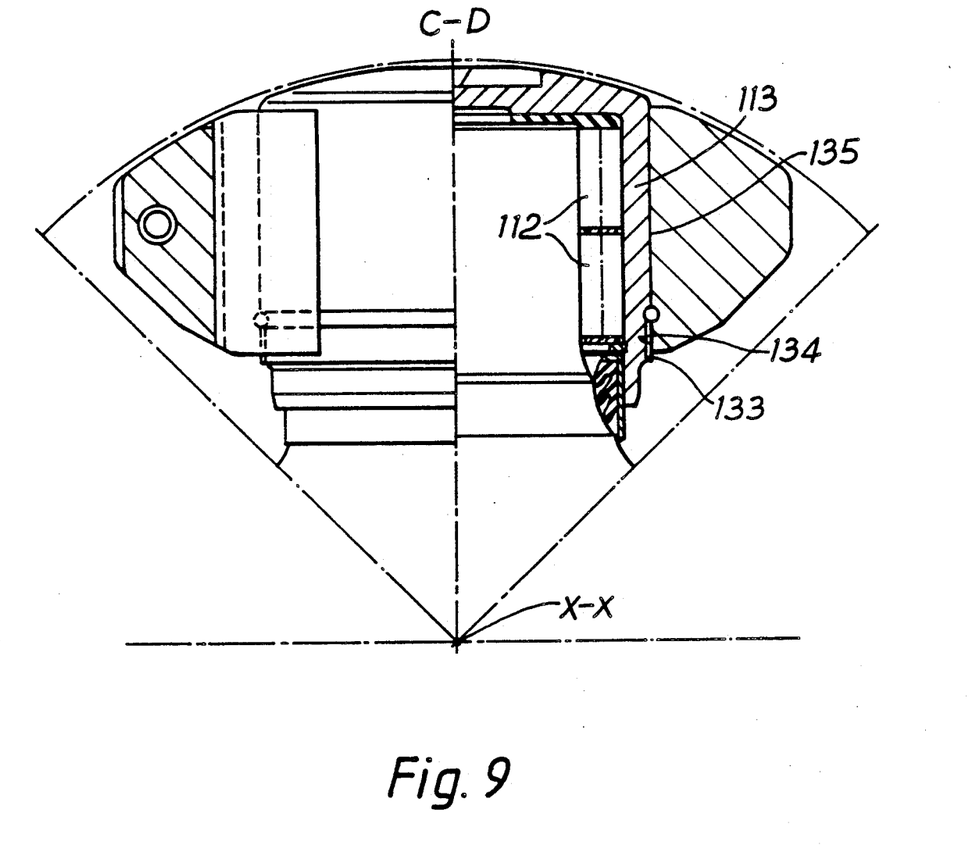
FIG. 9 is a section on the line C—D of FIG. 8.

Referring now to FIGS. 8 and 9 of the drawings, these illustrate a further embodiment of the invention. The same reference numerals but in the 100 series are used for parts corresponding to the parts above described in relation to FIGS. 2 and 3. Thus FIGS. 8 and 9 show part of a yoke arm 106 with a main part 108 and a removable free end portion 115. The arm has a bore 109 of which part of the circumferential surface, as indicated at 109b, is provided in the removable portion 115. A journal 111 of a joint cross member received in a bearing bush 113 with the intermediary of rollers 112 is shown supported in the bore 109.

In this embodiment, the end portion 115 of the yoke arm has engagement with the main portion 108 of the arm by way of inter-engaging dovetail formations with faces 118, 119 abutting one another at a joint face 117, but in this embodiment the dovetail faces, instead of being frusto conical, are straight and parallel to the axis 114 of the bore in the yoke arm. To engage these dovetail formations, the removable portion 115 is kept in a constant orientation and fitted by moving it in the direction parallel to the axis 114.

The external circumferential surface of the bearing bush 113 is provided, in a region which is nearest the axis of rotation X—X of the joint yoke, with a screw-thread 133. This engages with a complementary screw-thread 134 provided in the bore 109, including the part 109b of the bore surface provided in the removable portion 115. Final movement of the bearing bush into its required position in the bore in the yoke arm is thus achieved by turning the bearing bush to engage the screw threads. When the screw threads are thus engaged, the removable portion 115 is held in position by its screw-threaded engagement with the bearing bush.

As in the embodiment described in relation to FIGS. 2 to 7 of the drawings, fitting of the bearing bush may be facilitated by applying a bending force to the removable portion 115 to deform it and provide a local increase in clearance of the bearing bush and the part 109b of the bore surface.

In both the above described embodiments of joint yoke arm, the main part of the arm is not weakened by the provision of screw-threaded bores for the attachment of the removable arm portions.

We claim:

1. A Hookes universal joint comprising two joint yokes having respective rotational axes, and a cross-member connecting the joint yokes together;

each yoke comprising two spaced arms extending generally parallel to the rotational axis of the yoke, said arms being connected together at their respective one ends and being provided adjacent their other, free, ends with bores having axes aligned with one another and extending perpendicular to the rotational axis of the yoke; said bores receiving bearing bushes supporting an opposed pair of journals of the cross-member;

each yoke arm comprising a main part and a removable portion connected to the main part of the arm in the region of the bore but offset from the bore axis towards the free end of the arm;

wherein the main part and removable portion of each yoke arm have interengaging dovetail formations which connect the main part to the removable portion, and the bearing bush being arranged so as to hold the removable portion relative to the main part so that said dovetail formations cannot disengage.

2. A universal joint according to claim 1 wherein said interengaging dovetail formations comprise part-frusto-conical faces, disposed about a cone axis spaced from and parallel to the rotational axis of the yoke and intersecting the bore axis.

3. A universal joint according to claim 2 wherein said faces have maximum and minimum diameters greater than the thickness of the yoke arm and smaller than the width thereof in respective planes perpendicular to the cone axis and containing said diameters.

4. A universal joint according to claim 1 wherein said dovetail formations extend parallel to the axis of the bore, and the bearing bush has a screw-threaded external circumferential surface portion engaging correspondingly screw-threaded portions of the bore surface in the main part and removable portion of the arm.

5. A universal joint according to claim 4 wherein said screw-threaded portions of the bearing bush and the bore surface are provided in regions thereof nearest the rotational axis of the yoke.

6. A universal joint according to claim 1 wherein, apart from the interengaging dovetail formations, the main part and removable portion of the yoke arm have facing surfaces defining a gap therebetween.

7. A universal joint according to claim 1 wherein the connection between the removable portion and main part of the yoke arm intersects the bore in the arm at a position to give, when the removable portion is removed, an opening into the bore of a width greater than the diameter of the journal of the cross member.

8. A method of assembling a universal joint having two joint yokes with respective rotational axes, and a cross-member connecting the joint yokes together, each yoke comprising two spaced arms extending generally parallel to the rotational axis of the yoke, said arms being connected together at their respective one ends and being provided adjacent their other, free, ends with bores having axes aligned with one another and extending perpendicular to the rotational axis of the yoke; said bores receiving bearing bushes supporting an opposed pair of journals of the cross-member, each yoke arm comprising a main part and a removable portion connected to the main part of the arm in the region of the bore but offset from the bore axis towards the free end of the arm, wherein the main part and removable portion of each yoke arm having interengaging dovetail formations which connect the main part to the removable portion, and the bearing bush being arranged so as to hold the removable portion relative to the main part so that said dovetail formations cannot disengage, the method comprising, for each yoke arm, introducing the journal of the joint cross member into the bore while the removable portion of the yoke arm is removed, fitting the removable portion of the yoke arm to the main portion thereof and interengaging said dovetail formations, and inserting said bearing bush into the bore along the bore axis; further comprising, during said insertion of the bearing bush, subjecting said removable portion to a bending force to cause an increase in a diametrical dimension of the bore in the region of said removable portion, and removing said bending force after the bearing bush has been inserted.

9. A device for use in a method of assembling a universal joint comprising two joint yokes having respective rotational axes, and a cross-member connecting the joint yokes together, each yoke comprising two spaced arms extending generally parallel to the rotational axis of the yoke, said arms being connected together at their respective one ends and being provided adjacent their other, free, ends with bores having axes aligned with one another and extending perpendicular to the rotational axis of the yoke; said bores receiving bearing bushes supporting an opposed pair of journals of the cross-member, each yoke arm comprising a main part and a removable portion connected to the main part of the arm in the region of the bore but offset from the bore axis towards the free end of the arm, wherein the main part and removable portion of each yoke arm have interengaging dovetail formations which connect the main part to the removable portion, and the bearing bush being arranged so as to hold the removable portion relative to the main part so that said dovetail formations cannot disengage, the method comprising, for each yoke arm, introducing the journal of the joint cross member into the bore while the removable portion of the yoke arm is removed, fitting the removable portion of the yoke arm to the main portion thereof and interengaging said dovetail formations, and inserting said bearing bush into the bore along the bore axis; further comprising, during said insertion of the bearing bush, subjecting said removable portion to a bending force to cause an increase in a diametrical dimension of the bore in the region of said removable portion, and removing said bending force after the bearing bush has been inserted, the device comprising a member having end portions engageable with spaced parts of said removable portion, and between said end portions a bore receiving a bolt for screw-threaded engagement with said removable portion whereby said bending force is applied thereto.

10. A Hookes universal joint comprising two joint yokes having respective rotational axes, and a cross-member connecting the joint yokes together;

each yoke comprising two spaced arms extending generally parallel to the rotational axis of the yoke, said arms being connected together at their respective one ends and being provided adjacent their other, free, ends with bores having axes aligned with one another; said bores receiving bearing bushes supporting an opposed pair of journals of the cross-member;

each yoke arm comprising a main part and a removable portion connected to the main part of the arm in the region of the bore but offset from the bore axis towards the free end of the arm;

wherein the main part and removable portion of each yoke arm have interengaging part-frusto-conical faces which connect the main part to the removable portion, and which are disposed about a cone axis spaced from and parallel to the rotational axis of the yoke and intersecting the bore axis; said faces have maximum and minimum diameters greater than the thickness of the yoke arm and smaller than the width thereof in respective planes perpendicular to the cone axis and containing said diameters.

11. A Hookes universal joint comprising two joint yokes having respective rotational axes, and a cross-member connecting the joint yokes together;

each yoke comprising two spaced arms extending generally parallel to the rotational axis of the yoke, said arms being connected together at their respective one ends and being provided adjacent their other, free, ends with bores receiving bearing bushes supporting an opposed pair of journals of the cross-member;

each yoke arm comprising a main part and a removable portion connected to the main part of the arm in the region of the bore but offset from the bore axis towards the free end of the arm;

wherein the main part and removable portion of each yoke arm have interengaging dovetail formations which connect the main part to the removable portion, and the bearing bush and complementary parts of the bore provided in the main part and removable portion of the arm have interengaging screw-threads.

* * * * *